United States Patent
Kamei

(10) Patent No.: US 6,493,830 B2
(45) Date of Patent: *Dec. 10, 2002

(54) CLOCK CONTROL DEVICE USED IN IMAGE FORMATION

(75) Inventor: Masafumi Kamei, Numazu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/343,185

(22) Filed: Jun. 30, 1999

(65) Prior Publication Data

US 2002/0120881 A1 Aug. 29, 2002

(30) Foreign Application Priority Data

Jul. 3, 1998 (JP) ............................................ 10-202875
Oct. 29, 1998 (JP) ............................................ 10-322930

(51) Int. Cl.$^7$ ................................................ G06F 1/08
(52) U.S. Cl. ...................................................... 713/501
(58) Field of Search ................................ 713/500, 501, 713/502, 503

(56) References Cited

U.S. PATENT DOCUMENTS

| 4,819,186 A | * | 4/1989 | Ohta et al. .................. 364/519 |
| 5,631,920 A | | 5/1997 | Hardin ........................ 375/200 |
| 5,712,929 A | * | 1/1998 | Kawamura et al. ......... 382/270 |
| 5,757,338 A | | 5/1998 | Bassetti et al. ................ 345/3 |

FOREIGN PATENT DOCUMENTS

EP          0 752 784          1/1997

* cited by examiner

Primary Examiner—Thomas M. Heckler
(74) Attorney, Agent, or Firm—Fitzpatrick, Cella, Harper & Scinto

(57) ABSTRACT

Video data (default data in case of a black original) output from a CCD line sensor 405 upon reading an image while a light source is kept OFF corresponds to beat noise contained in video data obtained upon reading an image while the light source is ON. After the beat noise data is stored, the correction data stored in a correction data storage unit is subtracted from video data read by a normal technique while the light source is ON in a correction memory, thus executing correction for removing beat noise. After the beat noise is removed in this way, when an image is formed under the control of a printer control unit, an image free from any beat noise can be obtained as an output image.

22 Claims, 16 Drawing Sheets

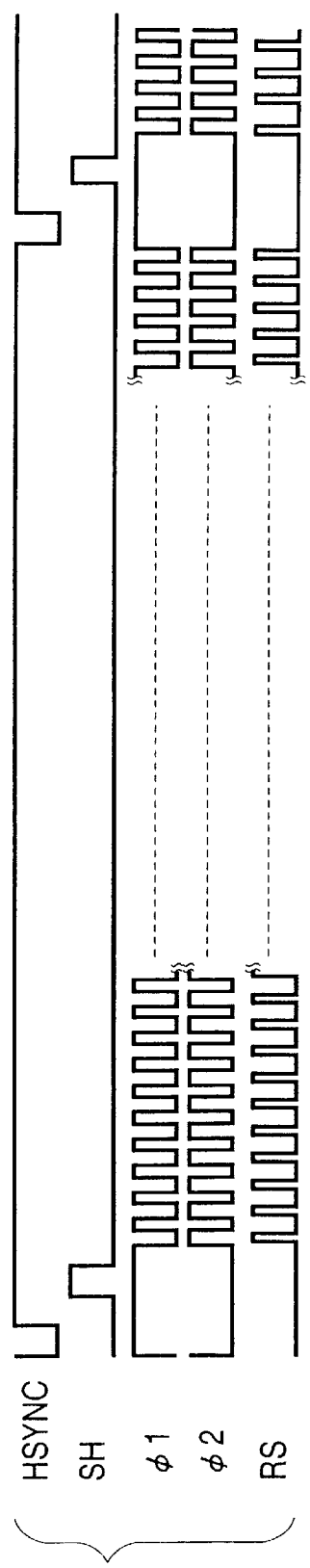

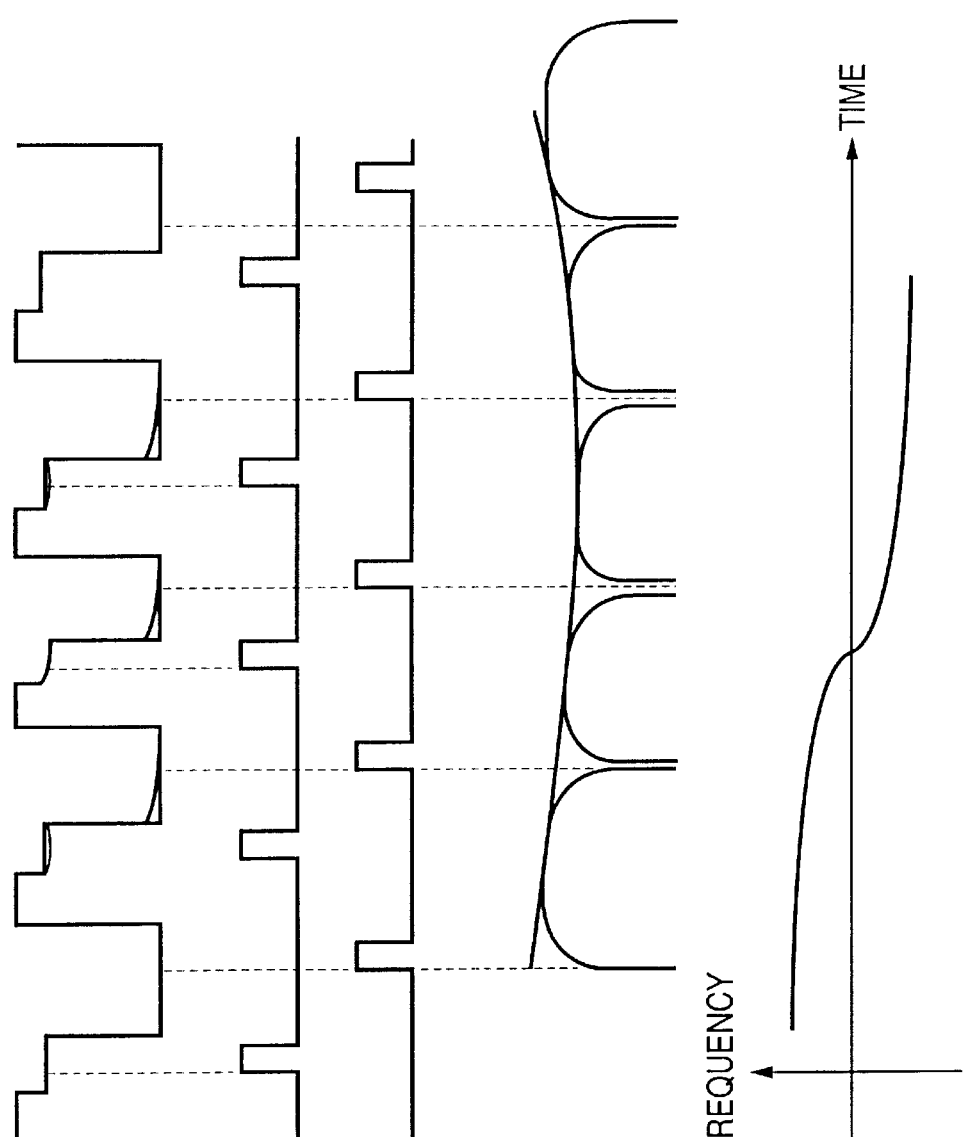

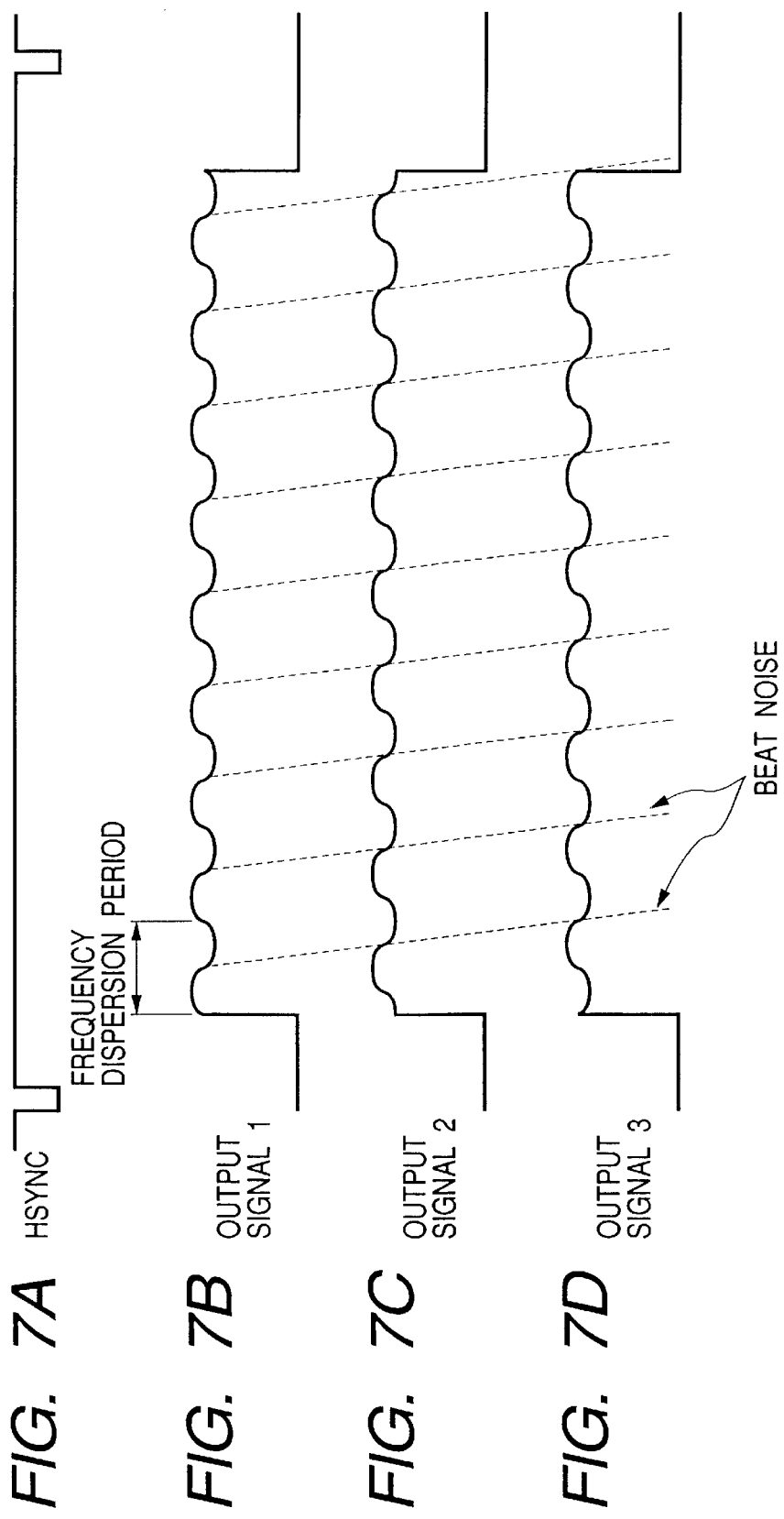

CLOCK CONTROL DEVICE USED IN IMAGE FORMATION

BACKGROUND OF THE INVENTION

1. Field of the Invention

The present invention relates to an image forming apparatus and signal processing apparatus using a frequency dispersion technique for continuously modulating oscillation frequency.

2. Related Background Art

Most image forming apparatuses are designed to control operations of individual units thereof using control and drive clocks generated based on clocks with high oscillation accuracy.

However, regulations that require suppression of radiation noise produced by the operation of image forming apparatuses are becoming increasingly strict each year. As a counter measure to such regulations, frequency dispersion techniques that intentionally lower apparent oscillation accuracy are known. The frequency dispersion technique has an effect of integrally lowering a radiation noise peak by periodically and continuously changing the oscillation frequency. Since the phase relationship among various control and drive clocks, which clocks are generated based on a frequency-dispersed clock signal, is maintained, normal operation can be assured in a digital system, except for special cases.

However, when frequency dispersion is used in analog signal processes, and an output signal from a device such as a CCD line sensor, which is driven by a digital clock signal and outputs an analog signal waveform associated with the phase relationship among the clock signals and pulse width, is to be processed, beat noise that responds to the period of frequency dispersion is produced. The beat noise results from the influences of data variations of the output signal waveform of the CCD line sensor and of sampling positions that change slightly under the influences of the period of frequency dispersion and frequency dispersion of the drive clock signal of the CCD line sensor. Further, when beat noise asynchronous with a reference signal is present during image formation, an image resulting from the beat noise unwantedly forms on image formation.

SUMMARY OF THE INVENTION

It is an object of the present invention to attain satisfactory image formation by suppressing production of beat noise upon processing image data by using the frequency dispersion technique.

It is another object of the present invention to correct any slight deviation of a modulation period produced as a result of using the frequency dispersion technique, and to stabilize the operation level while maintaining the reduced radiation noise level.

In order to achieve the above objects, an image forming apparatus according to one aspect of the present invention comprises image reading means for reading image data, oscillation means for oscillating a reference clock at predetermined periods, frequency dispersion means for generating a clock signal having a frequency higher than a frequency of the reference clock using the reference clock, and continuously changing the frequency of the generated clock signal at the predetermined periods with respect to the frequency of the reference clock, control clock generation means for generating a control clock using the clock signal, the frequency of which is continuously changed by the frequency dispersion means, and reset means for resetting the continuous change in frequency of the clock signal by the frequency dispersion means at a read timing of the image reading means.

A clock generation device according to another aspect comprises a plurality of oscillation output means for performing frequency dispersion that continuously changes an oscillation frequency at predetermined periods with respect to a reference clock, and a plurality of reset means for resetting the frequency dispersion of the plurality of oscillation output means in accordance with a reference signal generated based on the reference clock.

An analog signal processing device according to still another aspect comprises a clock generator for generating a control clock by performing frequency dispersion that continuously changes an oscillation frequency at predetermined periods with respect to a reference clock, an analog signal processing unit for processing a predetermined analog signal in accordance with the control clock, and correction means for correcting an error in a modulation period between the control clock and the analog signal, which error is produced by frequency dispersion of the clock generator.

An image forming apparatus according to still another aspect comprises a plurality of oscillation output means for generating drive and control clocks by performing frequency dispersion that continuously changes an oscillation frequency at predetermined periods with respect to a reference clock, image reading means for reading an image in accordance with the drive clock, signal processing means for performing a process that pertains to image formation with respect to an output signal from the image reading means in accordance with the control clock, and correction means for correcting an error in a modulation period between the control clock and the output signal from the image reading means, which error is produced by frequency dispersion of the plurality of oscillation output means.

With these arrangements, images can be satisfactorily formed while suppressing production of beat noise. Also, any slight deviation of the modulation period can be corrected, and the operation level can be stabilized while maintaining the reduced radiation noise level.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 4 is a waveform chart showing signals that pertain to image reading;

FIGS. 6A, 6B, 6C, 6D and 6E are signal output timing charts of an analog image signal processing system in the image forming apparatus using frequency dispersion;

FIGS. 7A, 7B, 7C and 7D are timing charts showing the output timings of output signals when beat noise resulting from frequency dispersion has been produced;

DETAILED DESCRIPTION OF THE PREFERRED EMBODIMENTS

The preferred embodiments of the present invention will be described hereinafter with reference to the accompanying drawings.

The first embodiment of the present invention will be described below with reference to FIGS. 1 to 11.

Figure 1:
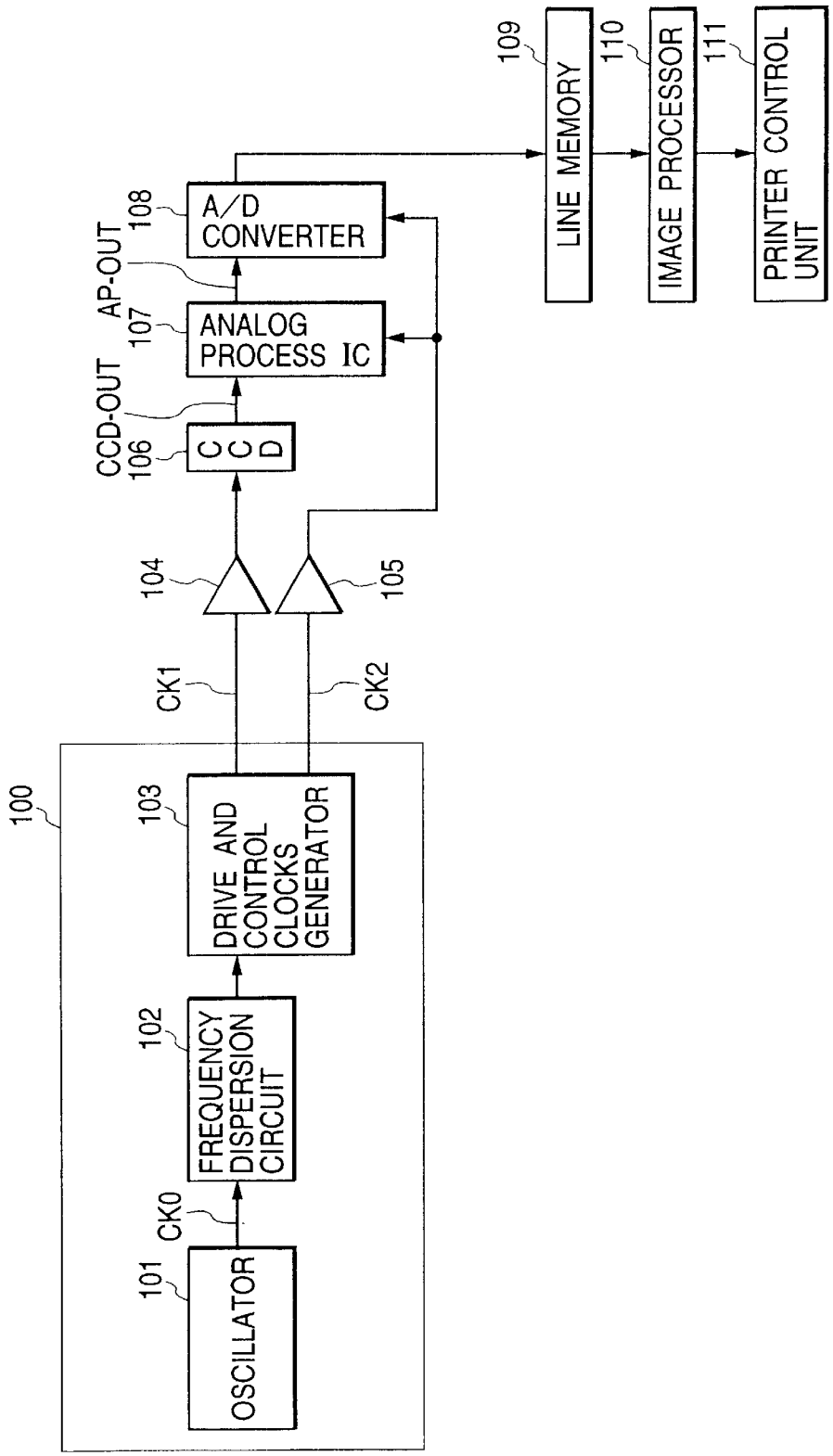
FIG. 1 is a schematic block diagram showing the arrangement of an image forming apparatus using the frequency dispersion technique.

FIG. 1 is a schematic block diagram showing the arrangement of an image forming apparatus using the aforementioned frequency dispersion technique.

Referring to FIG. 1, a clock signal generation unit 100 comprises an oscillator 101, frequency dispersion circuit 102, and drive and control clocks generator 103. The oscillator 101 is an oscillation means having a quart oscillator, quartz oscillation element, or the like, which is often used. Also, recently available oscillators which can program an oscillation frequency, and an oscillator including a frequency dispersion circuit, may be used as the oscillator 101 and frequency dispersion circuit 102.

An oscillation signal output from the oscillator 101 is supplied to the drive and control clock generator (a pulse generator constructed by a gate array or the like) 103 via the frequency dispersion circuit 102. The drive and control clock generator 103 generates CCD drive clocks CKI and analog signal processing clocks CK2 on the basis of the output from the frequency dispersion circuit 102.

A CCD 106 is driven by the CCD drive clocks CK1, and its output signal CCD-OUT is input to an analog processer IC 107. An output signal AP-OUT from the analog process IC 107 is input to an A/D converter 108 as a sample/hold output of the A/D converter 108. During this interval, the analog processer IC 107 and A/D converter 108 receive the analog signal processing clocks CK2. After that, a video signal which is the output from the A/D converter 108 is temporarily stored in a line memory 109, and is then sent to a printer control unit 111 via an image processor 110.

Figure 2:
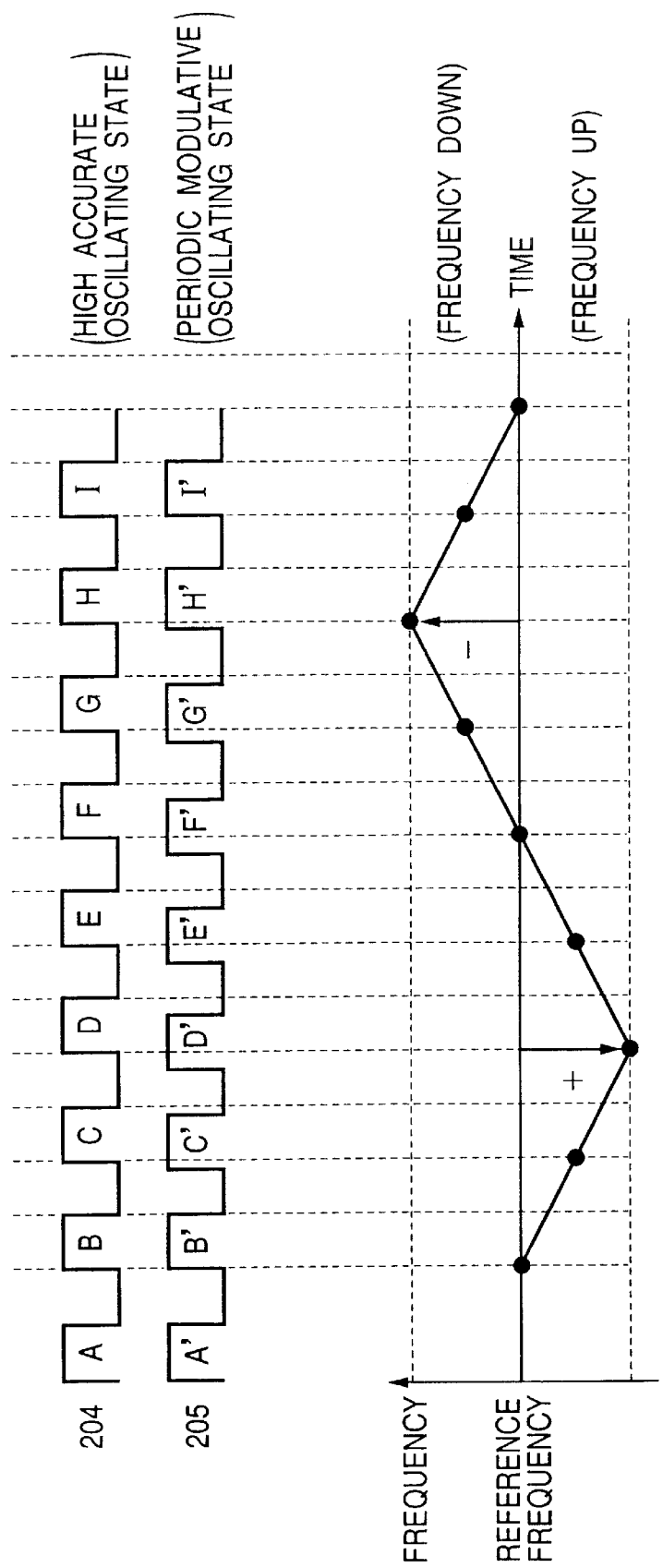
FIG. 2 is a waveform chart for explaining an outline of frequency dispersion.

As the oscillator 101, one having oscillation accuracy as high as 100 PPM or 50 PPM (high accurate oscillating state) like pulses A to I shown in a waveform 204 in FIG. 2 is generally selected. By contrast, the frequency dispersion circuit 102 oscillates while slightly changing the clock frequency like pulses A' to I' shown in a waveform 205 in FIG. 2 (periodic modulative oscillating state). In this case, the frequency increases or decreases, as shown in, e.g., the time vs. frequency graph in FIG. 2.

In the graph in FIG. 2, the abscissa plots time, and the ordinate plots the frequency. The graph in FIG. 2 shows how the frequency changes along with an elapse of time. More specifically, the frequency is controlled to smoothly change within a predetermined range (e.g., ±0.5% or ±1.0% in frequency calculation) to have a reference frequency (the oscillation frequency of the oscillator 101) as the center.

Note that the frequency normally has a regular frequency dispersion period, and a given modulation cycle is repeated, as shown in FIG. 2. The frequency changes in a direction to shorten the clock period (modulation toward higher frequency) by a predetermined modulation width, and then changes in a direction to prolong the clock period (modulation toward lower frequency) along the identical characteristic curve by a predetermined modulation width. The frequency then returns to oscillation at a fundamental frequency. In this manner, a timing in phase with the reference frequency is generated for each frequency dispersion period.

Figure 3:
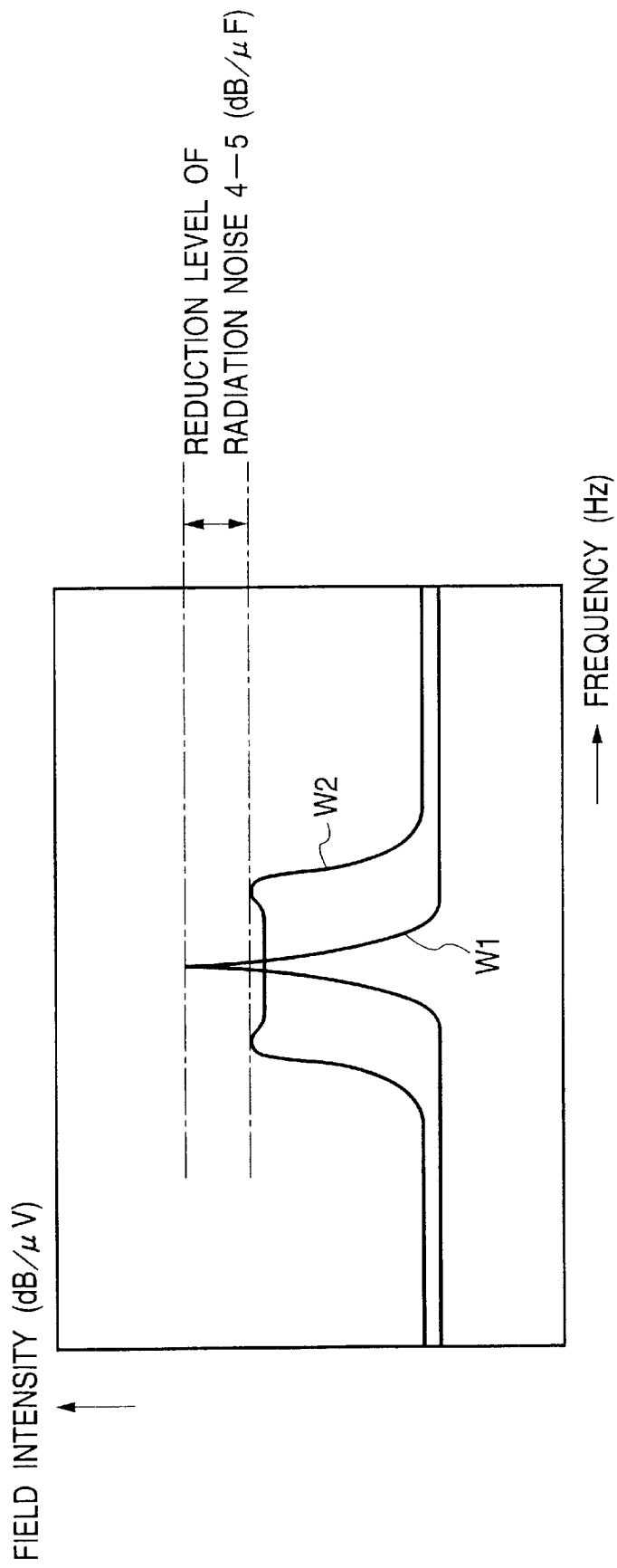
FIG. 3 is a graph showing the reduction effect of radiation noise.

Referring to FIG. 3, a waveform W1 is a spectral waveform of a clock signal having the reference frequency output from the oscillator 101, and a waveform W2 is a spectral waveform of a clock signal output from the frequency dispersion circuit 102. As shown in FIG. 3, the waveform W1 of the clock signal having the reference frequency, which is output from the oscillator 101, has a sharp peak at eigenfrequency, while the peak level of the waveform W2 of the clock signal output from the frequency dispersion circuit 102 lowers as if the clock signal is integrated, since the frequency is dispersed. As an effect of such frequency dispersion, a noise reduction effect of at least about 4 to 5 dB·$\mu$V/m in field intensity is expected even when the arrangement condition of the apparatus is bad, and that of 10 dB·$\mu$V/m or higher is expected depending on the arrangement condition of the apparatus, as shown in FIG. 3.

When the clock signal, which has been frequency-dispersed by the frequency dispersion circuit 102, is input to the drive and control clocks generator 103, all the clocks CK1 and CK2 output from the drive and control clocks generator 103 are output as frequency-dispersed clocks, thus obtaining a noise reduction effect of the entire system.

A phenomenon that poses a problem when the frequency dispersion technique is applied to an image forming apparatus will be explained below.

In most electrical components, an output signal suffers a delay with respect to an input signal, and in digital circuits, a clock is generally set in consideration of this so-called gate delay so that its edge is located near the center of the data (i.e., set within a range invulnerable to timing variations). By contrast, in analog signal processing, the sampling position of an analog signal which changes linearly considerably influences data. For example, in a device such as a CCD or the like, when feed through and data portions are present within the data interval of one pixel, and the level varies with linear characteristics, the read values have different levels unless data sampling is done at identical timings.

In addition to such general problem, when frequency dispersion is used in analog signal processing, since a reference clock is frequency-modulated, the pulse width of the CCD drive clock itself varies for each pixel, and the time required for one pixel of a CCD output signal also varies.

When a clock generator (drive and control clocks generator 103) for generating various drive clocks based on an external clock is used, the CCD drive clocks CK1 and the analog signal processing clocks CK2 such as sample/hold pulses used in the analog signal processing are frequency-modulated in phase on the basis of a reference clock CK0. However, in practice, some signals have a large delay amount with respect to the drive clock like an output signal of the CCD, and it is preferable that modulated analog signals are processed by synchronized modulation signals.

Figure 5A:
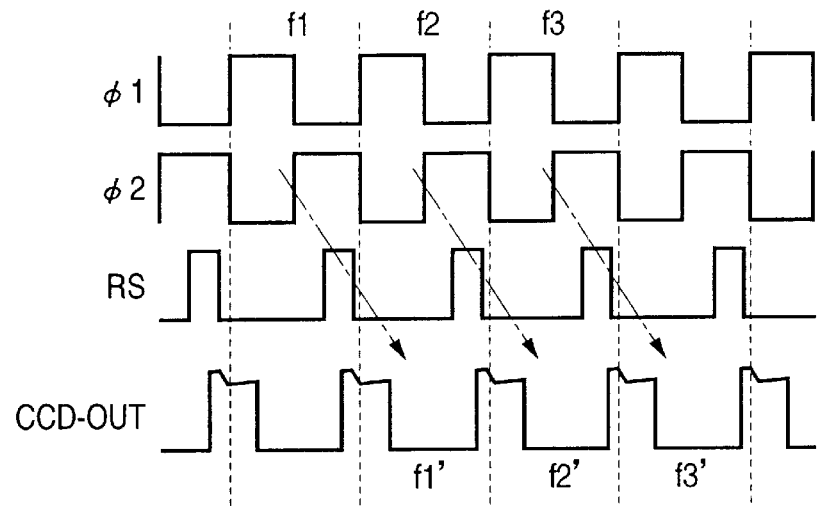
FIGS. 5A and 5B are waveform charts showing the relationship between the CCD drive clocks and CCD output signal.
Figure 5B:
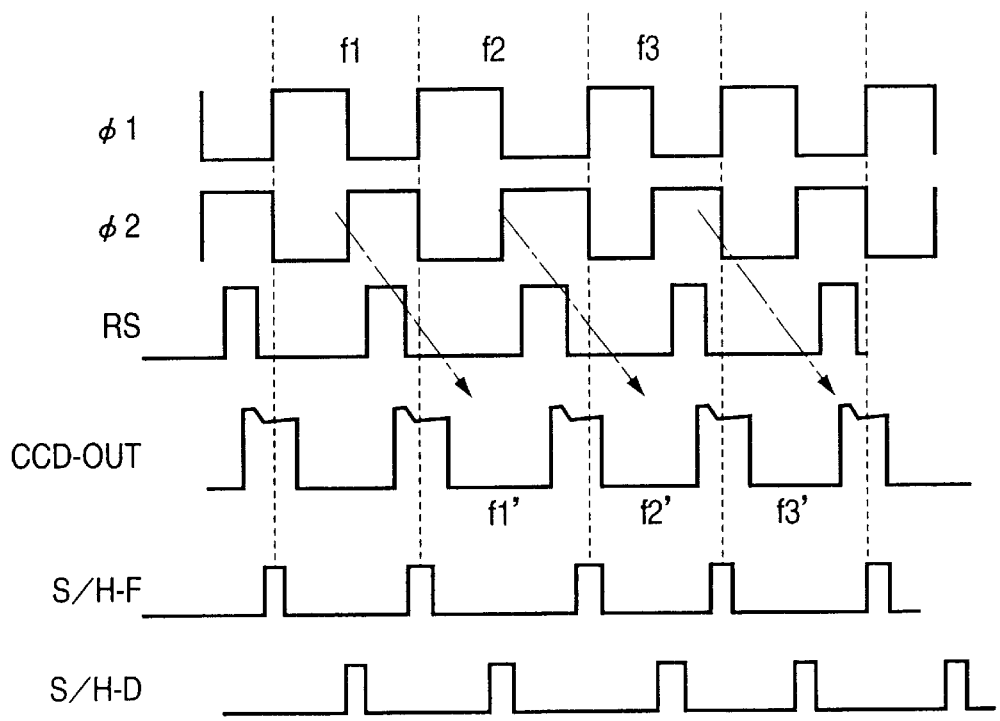

FIG. 4 is a waveform chart showing signals that pertain to image reading. FIGS. 5A and 5B are waveform charts showing the relationship between the CCD drive clock shown in FIG. 4 and the CCD output signal. FIG. 5A is a waveform chart showing an example without using frequency dispersion, and FIG. 5B is a waveform chart showing an example using frequency dispersion.

Referring to FIG. 4, a HSYNC signal represents the control interval of an image reading means in the main scanning direction, and serves as a so-called sync signal. With reference to this sync signal, the CCD drive clocks CK1 so that an SH signal, φ1, φ2, RS signal, and the like and analog signal processing clocks CK2 are generated. The SH signal shown in FIG. 4 is a shift pulse for making a charge accumulated on a photodiode of the CCD slide to a transfer register, and φ1 and φ2 are transfer clocks for transferring charges in the transfer register. The RS signal is a reset signal for resetting the residual charge in the output stage of the CCD for each pixel.

In the example without using frequency dispersion (an arrangement from which the frequency dispersion circuit 102 shown in FIG. 1 is removed), the CCD output CCD-OUT is output in response to the CCD drive clocks CK1 to have the phase relationship shown in FIG. 5A. In practice, the HSYNC signal is used as a sync signal, and as shown in intervals f1, f2, and f3 in FIG. 5A, the transfer clocks φ1 and φ1 for the respective pixels are clocks having the same frequency (period) and the RS signal changes at the same period. However, the CCD output CCD-OUT is output at timings delayed by one pixel, as shown in intervals f1', f2', and f3' (see one-dashed chain line arrows in FIG. 5A).

On the other hand, in the example using frequency dispersion (the arrangement shown in FIG. 1), the frequency (period) varies for each pixel of the transfer clocks φ1 nd φ2 compared to the example without using frequency dispersion shown in FIG. 5A, as shown in intervals f1, f2, and f3 in FIG. 5B. More specifically, the output signal CCD-OUT of the CCD 106 is not only simply delayed by one pixel, but also the relationship between the feed through portion (reference level) and data portion is influenced by the drive clocks CK1 (φ1, φ2, and the like) for the previous pixel (see one-dashed chain line arrows in FIG. 5B). However, as the RS signal is also repeatedly modulated, the data portion of the output signal CCD-OUT has an interval (width) which is under the influence of the current pixel.

In other words, the feed through portion of the output signal CCD-OUT of the CCD 106 in an interval f1' is determined by the RS signal in an interval f1, and its data interval is determined by the RS signal in an interval f2.

In actual CCD driving, when the CCD is driven at high speed, only a short feed through portion is produced. For this reason, when the modulation width of the RS signal varies due to frequency dispersion, and the pulse width changes little by little, the way the feed through portion is generated and the way the data portion is generated change delicately. As for the data portion, since the highest level portion in the data interval is sampled, even when the point slightly deviates back or forth, the data portion has nearly no influence unless a very large frequency modulation width is set.

However, since sample/hold pulses S/H-F and S/H-D (FIG. 5B) as the analog signal processing clocks CK2 are normally generated in synchronism with the HSYNC signal, sample/hold pulses S/H-F and S/H-D for sampling a CCD output CCD-OUT in an interval f1' are those in an interval f2. That is, sample/hold pulses S/H-F and S/H-D having a different modulation period are used for sampling the CCD output. As a result, the sampling point deviates gradually, and a slight level difference is produced for each pixel.

Note that the pulse S/H-F is a sample/hold pulse for sampling the feed through portion of the CCD output, and the pulse S/H-D is a sample/hold pulse for sampling the data portion of the CCD output.

FIGS. 6A to 6E show the signal output timings of an analog signal processing system in the image forming apparatus using frequency dispersion. FIG. 6A shows the output timing of an output signal of a CCD line sensor (i.e., an image data signal for one pixel read by the CCD line sensor), FIG. 6B shows the output timing of the S/H-F pulse for sampling the feed through portion, i.e., the reference level, of the output signal of the CCD line sensor, FIG. 6C shows the output timing of the S/H-D pulse for sampling the data level of the output signal of the CCD line sensor, FIG. 6D shows an image data signal obtained as a result of sampling/holding, and FIG. 6E shows the state wherein the operation frequency of each control signal changes along with an elapse of time.

As described above, using the frequency dispersion technique, the drive clock signal of the CCD line sensor is frequency-modulated along the frequency dispersion period, and the output signal width changes slightly for each pixel. The output signal waveform of the CCD line sensor changes depending on the pulse widths or phase relationship of an output stage transfer clock (φ 2B) (not shown) and the reset pulse (RS) for residual charge of the output stage. Hence, as shown in FIG. 6A, the waveforms of the reference and data level of the output signal of the CCD line sensor change. Also, as shown in FIGS. 6B and 6C, the pulse widths and sampling positions of the pulse S/H-F for sampling the feed through portion (reference level) of the CCD output signal, and the pulse S/H-D for sampling the data level change slightly. Consequently, as shown in FIG. 6D, beat noise that responds to the frequency dispersion period is superposed on the output signal as a result of sampling/holding.

Figure 8B:
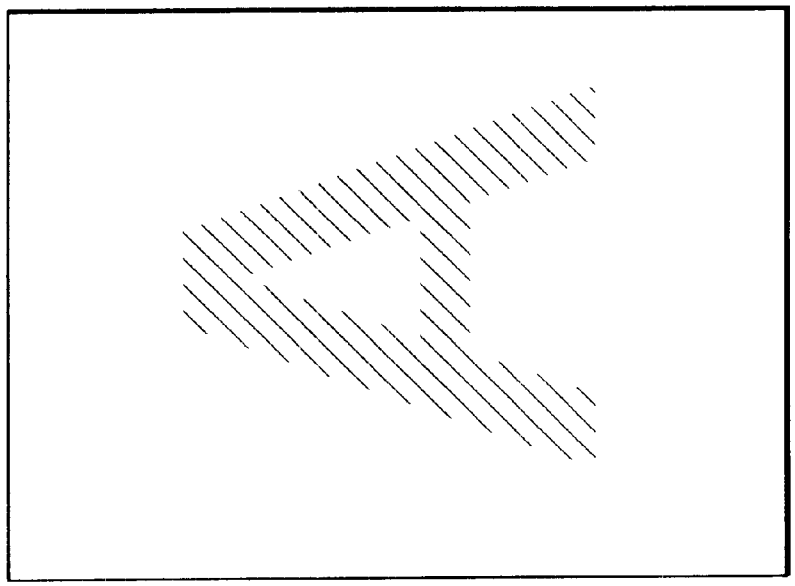
FIGS. 8A and 8B are explanatory views showing an example of output images as a result of image formation using read image data.
Figure 8A:
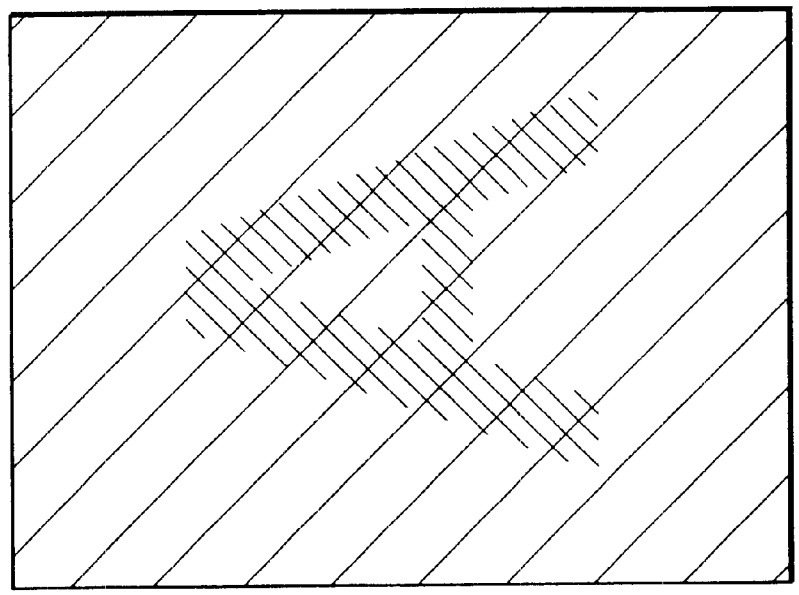

FIGS. 7A to 7D are timing charts showing the output timings of the output signals when beat noise resulting from frequency dispersion has been produced. FIG. 7A shows the output timing of the sync signal HSYNC, and FIGS. 7B to 7D show output signals for each pixel obtained as a result of sampling and holding the output signal from the CCD line sensor. FIGS. 8A and 8B are explanatory views showing an example of output images obtained as a result of image formation using read image data.

As shown in FIGS. 7B to 7D, beat noise appears in the output signal from the CCD line sensor, i.e., an analog image signal for each pixel along the frequency dispersion period. When the frequency dispersion circuit and sync signal HSYNC are not synchronized, beat noise flows, as shown in FIGS. 7B to 7D. Hence, when image formation is done based on such output signal containing beat noise, an image containing beat noise is formed, as shown in FIG. 8A.

To solve this problem, this embodiment adds a zero reset function to the frequency dispersion circuit so as to realize noise reduction by fixed noise pattern processing by fixing beat noise at a given position, and adopts a circuit designed to control generation of drive and control clocks in synchronism with the accumulation time of the CCD line sensor.

Figure 9:
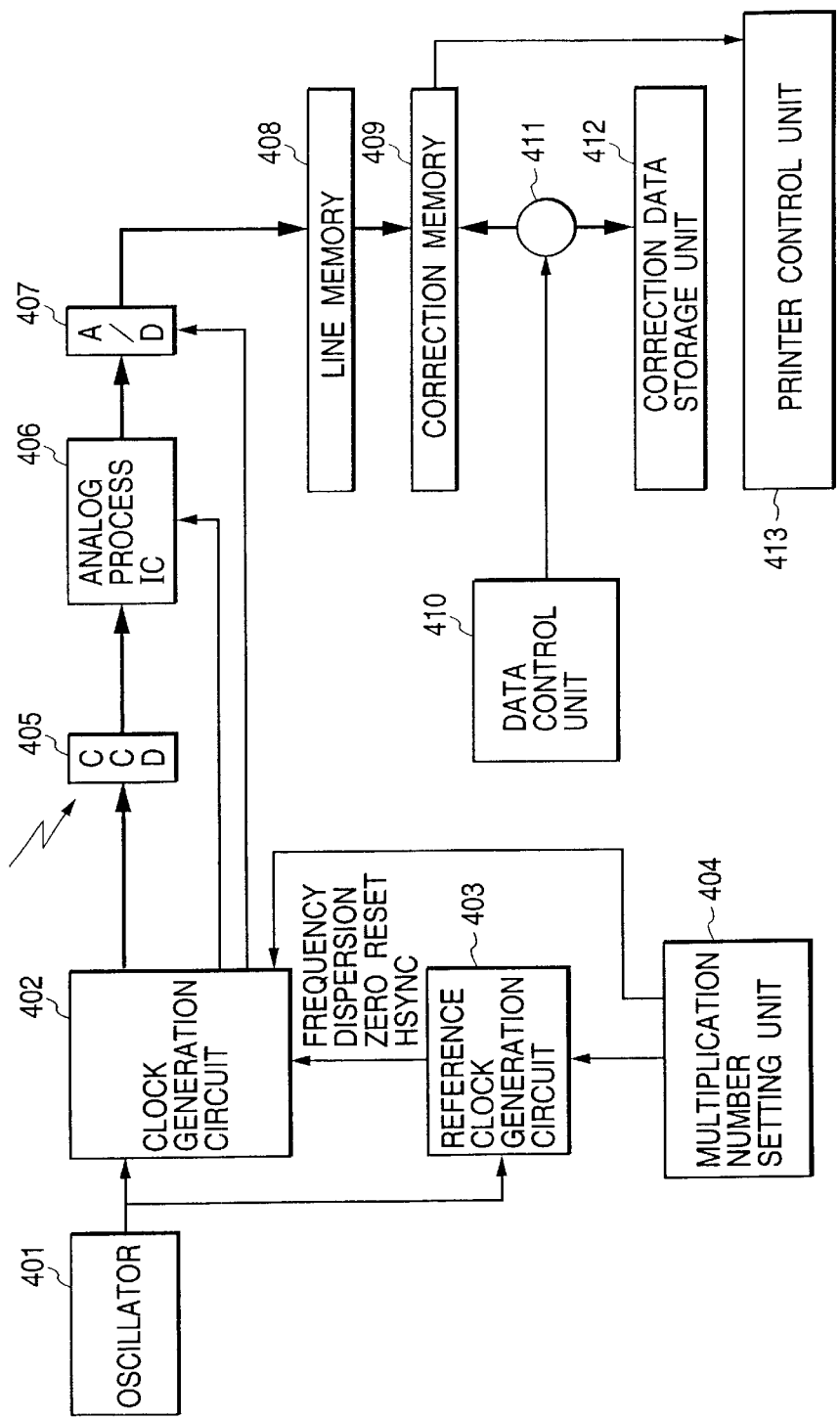
FIG. 9 is a schematic block diagram showing the arrangement of an image forming apparatus in the first embodiment.
Figure 10:
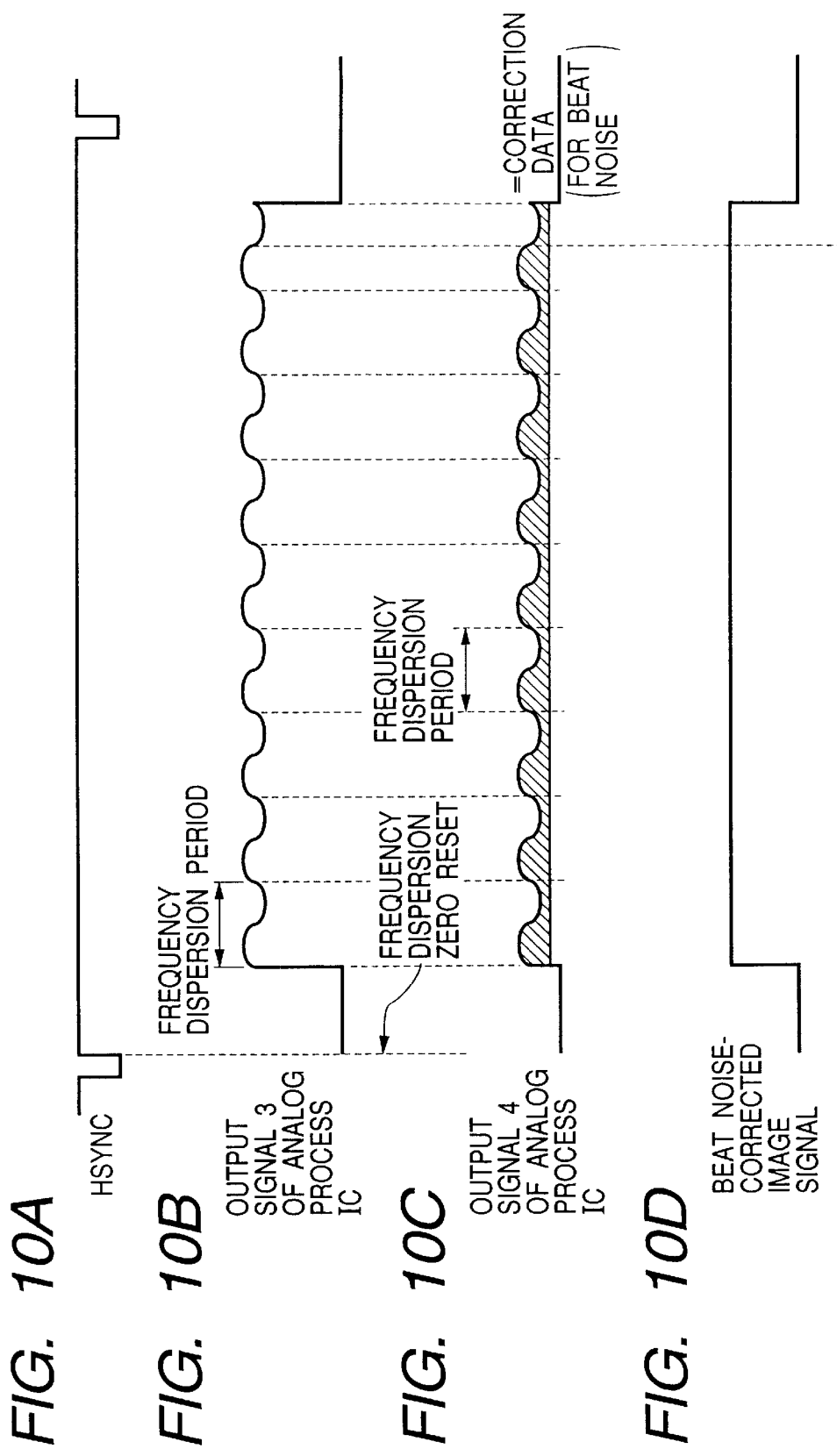
FIGS. 10A, 10B, 10C, and 10D are timing charts showing the output timings of signals generated in the image forming apparatus shown in FIG. 9.

FIG. 9 is a block diagram showing the overall arrangement of an image forming apparatus that adopts such clock generation unit.

Referring to FIG. 9, an oscillator 401 oscillates clock signals at given periods, and is the same as the oscillator 101 shown in FIG. 1. A clock generation unit 402 incorporates a frequency dispersion circuit. The clock generation unit 402 also incorporates a PLL (Phase Lock Logic) circuit, multiplication drive circuit, counter circuit, and comparison circuit in addition to the aforementioned frequency dispersion circuit, and generates a plurality of kinds of drive and control clock signals. The clock generation unit 402 is connected to an analog process IC 406 and A/D converter 407 (to be described later), and the generated drive and control signals are supplied to the analog process IC 406 and A/D converter 407.

A reference clock generation unit 403 supplies stable clock signals to the clock generation unit 402, and incorporates a PLL circuit, multiplication drive circuit, counter circuit, and comparison circuit. The reference clock generation unit 403 generates a frequency dispersion zero reset signal HSYNC.

The clock signal oscillated by the oscillator 401 is sent to the clock generation unit 402 and reference clock generation unit 403. The reference clock generation unit 403 generates a reference clock, i.e., the frequency dispersion zero reset signal HSYNC, on the basis of the clock signal sent from the oscillator 401, and sends it to the clock generation unit 402. Upon receiving the frequency dispersion zero reset signal HSYNC, frequency modulation of the internal frequency dispersion circuit of the clock generation unit 402 is temporarily reset, and frequency dispersion control is restarted from the reference frequency according to the predetermined control.

A multiplication number setting unit 404 sets the oscillation multiplication number of the internal PLL circuits of the clock generation unit 402 and reference clock generation unit 403. When the power supply of the image forming apparatus is turned on, a predetermined multiplication number is set, and oscillation is started at the speed required for clock signal generation.

A CCD line sensor 405, of the type used in copying machines, image scanners, facsimile machines and the like, receives the frequency-dispersed drive clock signal generated by the clock generation unit 402, and its driving is controlled by this drive clock signal.

The analog process IC 406 is driven by the drive clock signal generated by the clock generation unit 402. The analog process IC 406 samples the output signal from the CCD line sensor 405, and performs offset control and gain control to make that sampling signal fall within the input range of the A/D converter 407 connected to the output side of the IC 406. The above-mentioned beat noise is superposed on the output signal from the analog process IC 406, and this output signal is converted into video data as digital data by the A/D converter 407. The video data is supplied to a correction memory 409 via a line memory 408.

When it is determined by a method to be described later that beat noise reduction correction by the correction memory 409 is not necessary, the video data is sent to a printer control unit 413, thus forming an image by a known method.

On the other hand, when correction data must be sampled by a data control unit 410, an original irradiation unit, such as, for example, a light source (not shown) of the image forming apparatus is turned off, and beat noise data is then stored in a correction data storage unit 412 via a transfer unit 411. More specifically, video data (default data in case of a black original) output from the CCD line sensor 405 upon reading an image while the light source is kept OFF corresponds to beat noise included in video data obtained upon reading an image while the light source is ON.

After the beat noise data is stored, the correction data stored in the correction data storage unit 412 is subtracted from the video data read by the normal method while the light source is ON in the correction memory 409, thus performing correction for removing beat noise. The video data obtained as a result of the correction is sent to the printer control unit 413 as an image signal from which beat noise is removed.

After the beat noise is removed in this way, when an image is formed under the control of the printer control unit 413, an output image free from any beat noise can be obtained as an output image, as shown in FIG. 8B.

FIGS. 10A to 10D are timing charts showing the output timings of the signals generated in the image forming apparatus shown in FIG. 9. FIG. 10A shows the output timing of the frequency dispersion zero reset signal HSYNC, FIG. 10B shows the output signal from the analog process IC 406 before beat noise removal correction, FIG. 10C shows data stored in the correction data storage unit 412, i.e., beat noise data, upon sampling correction data, and FIG. 10D shows the output signal from the correction memory 409 after beat noise removal correction.

The output signal from the analog process IC 406 shown in FIG. 10B produces beat noise at timings synchronous with the frequency dispersion zero reset signal HSYNC. For this reason, in the arrangement shown in FIG. 9, the output signal after sampling and holding is repetitively output in phase in the sub-scanning direction. The output signal from the analog process IC shown in FIG. 10C corresponds to beat noise data stored in the correction data storage unit 412, as described above. Hence, when removal correction of beat noise data is done in the correction memory 409, a read image signal shown in FIG. 10D can be obtained.

Figure 11:
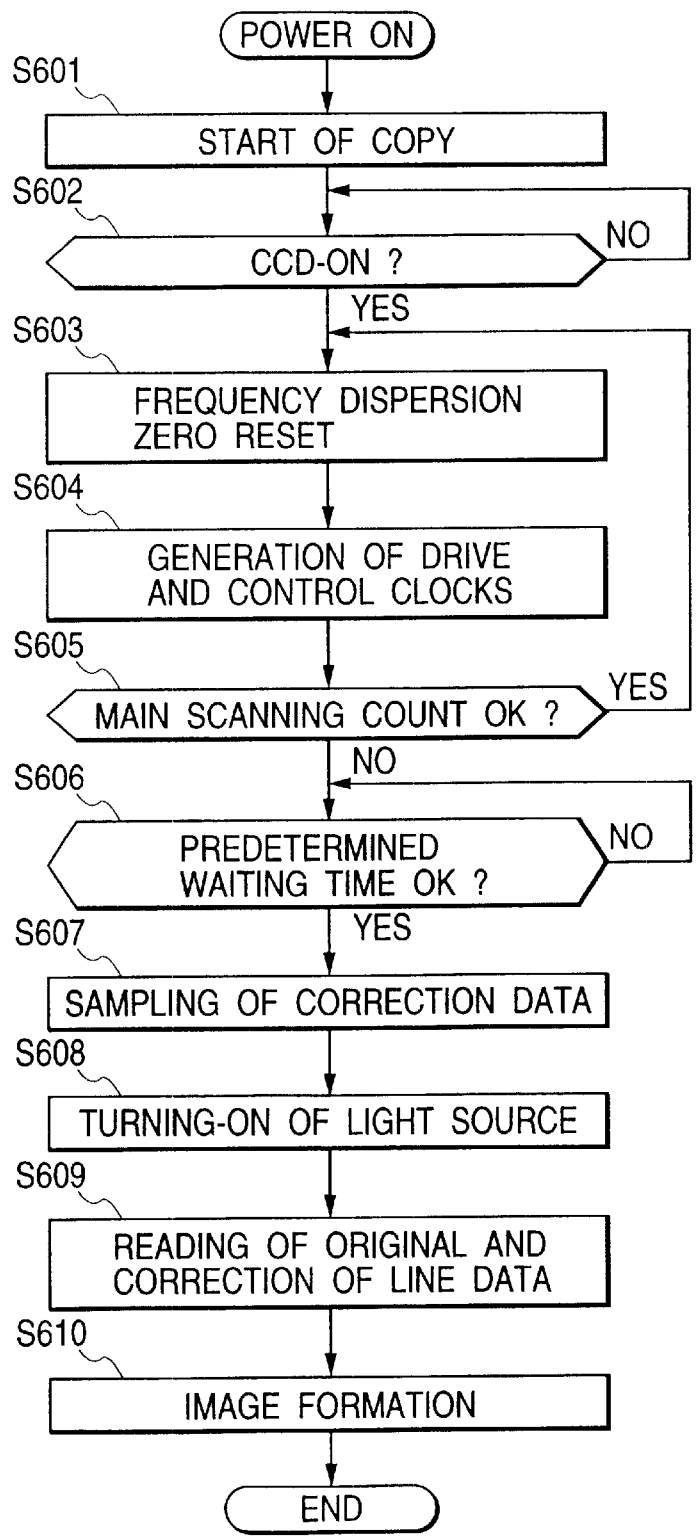
FIG. 11 is a flow chart showing the operation sequence of the image forming apparatus shown in FIG. 9.

FIG. 11 is a flowchart showing the operation sequence of the image forming apparatus shown in FIG. 9. In this sequence, when the operator turns on the power switch of the image forming apparatus and performs the copy start operation (step S601), the circuit system around the CCD line sensor 405 is set in a copy standby state in response to that operation.

Generally, as a countermeasure against temperature rise due to self heating, the CCD line sensor 405 or the like is disabled by controlling the power supply and drive clocks in a standby state. Hence, prior to the processing to be described below, it is checked if the CCD line sensor 405 is ON (step S602).

If the CCD line sensor 405 is ON, the drive clocks are activated at its ON timing, and the drive and control clock signals begin to be output simultaneously with frequency dispersion zero reset (steps S603 and S604). The oscillator 401 begins to oscillate, and the number of clocks begins to be counted. Then, frequency-dispersed clock signals are output from the clock generation unit 402 until the number of clocks corresponding to the accumulation time of the CCD line sensor 405 is counted (step S605).

If it is determined in step S605 that the number of clocks corresponding to the accumulation time of the CCD line sensor 405 has been counted, the internal counter is reset, and frequency dispersion zero reset is done. After this processing, the system can be controlled in synchronism with the frequency dispersion zero reset signal.

In practice, since a predetermined start-up time is required from when the CCD line sensor 405 is turned on and begins to be driven until the output signal from the CCD line sensor 405 becomes stable, it is checked using a timer (not shown) if the predetermined start-up time has elapsed (step S606). After the elapse of the predetermined start-up time, correction data is sampled (step S607). Upon sampling the correction data, beat noise superposed on reference black level is sampled while the light source is OFF.

The sampled correction data is stored in the correction data storage unit 412. Upon completion of sampling, the light source is turned on (step S608), an image on an original is read in units of lines in accordance with a normal image reading procedure, and data is corrected for every line using the correction data stored in the correction data storage unit 412 (step S609). In this case, frequency dispersion zero reset is done every time an image for one line is read. The corrected image data is sent to the printer control unit 413, and an image is formed by the printer control unit 413 (step S610).

With a series of operations described above, beat noise shown in FIG. 8A produced due to frequency dispersion is removed by correction, and a satisfactory image can be obtained, as shown in FIG. 8B.

As described above, according to this embodiment, every time copy operation is started, the frequency dispersion zero reset signal is input to the clock generation unit 402 to temporarily reset frequency modulation of the frequency dispersion circuit, and image reading is then started. Hence, the production position of beat noise can be prevented from deviating slightly every time an image for one line is read, as shown in FIGS. 7A to 7D, and beat noise can be fixed at a given position, thus realizing noise removal by fixed noise pattern processing. More specifically, correction data is sampled at the beginning of reading, and image data for each line is corrected using that correction data, thereby removing beat noise resulting from frequency dispersion, and obtaining a satisfactory image. Hence, high-quality image formation that maintains given quality of the read image data while maintaining a reduction effect of radiation noise can be realized.

The second embodiment of the present invention will be described below with reference to FIG. 12.

Figure 12:
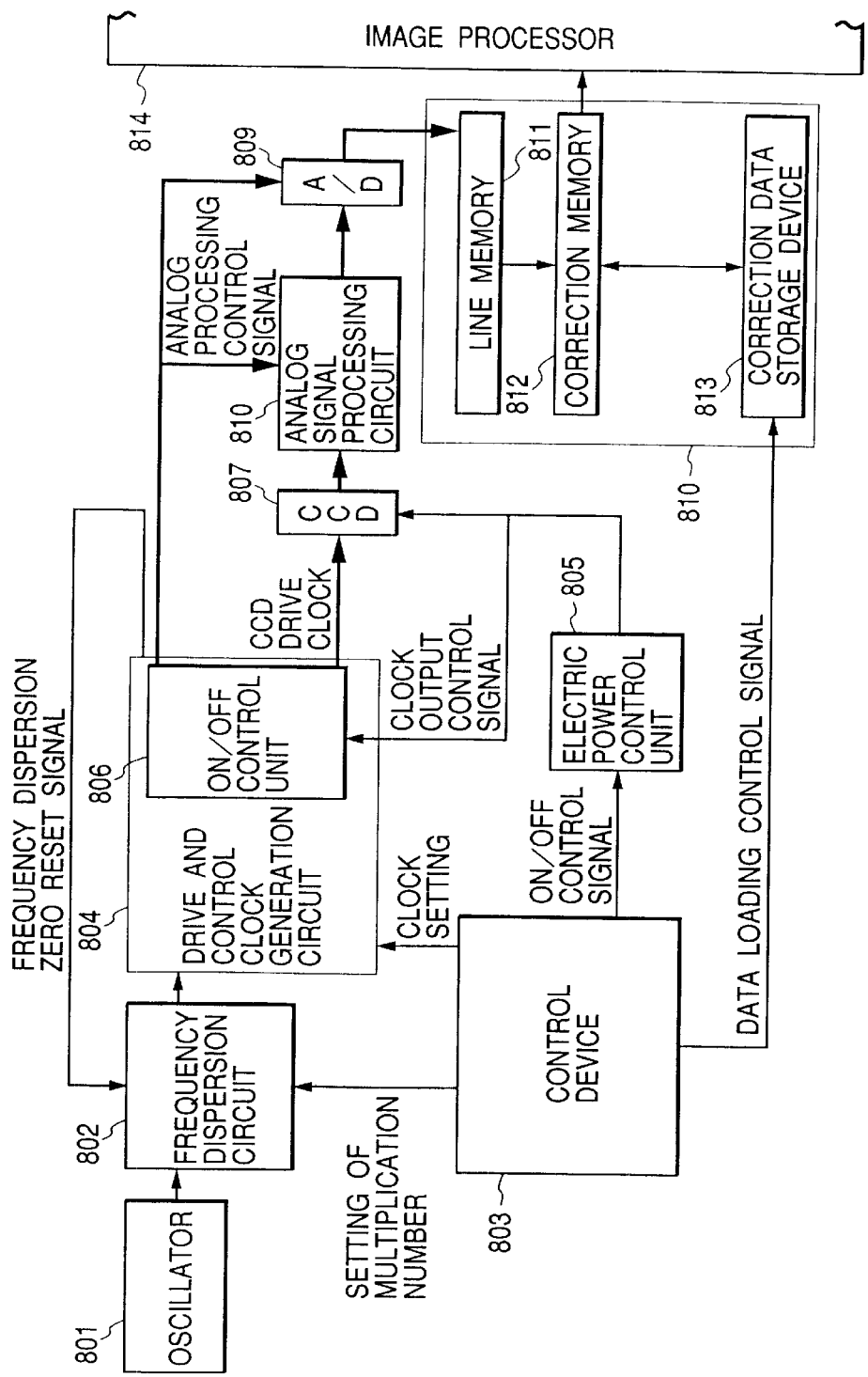
FIG. 12 is a schematic block diagram showing the arrangement of an image forming apparatus in the second embodiment.

FIG. 12 is a schematic block diagram showing the arrangement of an image forming apparatus according to this embodiment. Referring to FIG. 12, an oscillator 801 oscillates at eigenfrequency, and a frequency dispersion circuit 802 includes a PLL circuit in which a multiplication number can be set. Some PLL circuit arrangements cannot sufficiently follow the speed of frequency dispersion, i.e., cannot smoothly follow frequency dispersion. Hence, in this embodiment, the PLL circuit and multiplication circuit are combined in an input stage to apply frequency dispersion to output clocks from these circuits.

A control device 803 controls the overall image forming apparatus. The control device 803 changes the drive speed of the frequency dispersion circuit by setting the multiplication number, and controls ON/OFF of a power supply control unit 805 for supplying electric power to a CCD line sensor 807, sampling of correction data, and the like.

A drive and control clock generation circuit 804 incorporates an ON/OFF control unit 806 which controls ON/OFF of the CCD line sensor 807 by outputting drive clocks for driving the CCD line sensor 807 in response to a clock output control signal output from the power supply control unit 805. Upon receiving the frequency-dispersed clock signal output from the frequency dispersion circuit 802, the drive and control clock generation circuit 804 makes output control of ON/OFF control clocks from the ON/OFF control unit 806 to the CCD line sensor 807 in accordance with the state of an output voltage from the power supply control unit 805 (i.e., ON/OFF of the clock output control signal). More specifically, when the power supply control unit 805 ceases to supply any electric power, since the CCD drive clock signal need not be output, the output of the CCD drive clock signal from the ON/OFF control unit 806 is stopped. When the power supply is turned on under the control of the power supply control unit 805, the CCD line sensor 807 receives the CCD drive clock signal output from the ON/OFF control unit 806, and starts reading at a predetermined speed set by the control device 803.

The output signal from the CCD line sensor 807 is sent to an analog signal processing circuit 808, and undergoes processes such as sampling and holding, offset adjustment, gain adjustment, and the like by the analog signal processing circuit 808. The analog signal processing circuit 808 executes these processes in accordance with an analog processing control signal sent from the ON/OFF control unit 806.

The signal processed by the analog signal processing circuit 808 is converted into a video signal as a digital signal by an A/D converter 809. This video signal is input to a memory device 810.

The memory device 810 has a line memory 811, correction memory 812, and correction data storage device 813. The line memory 811 stores the video signal output from the A/D converter 809 for every main scanning line.

In this arrangement, upon starting a copy operation, a video signal stored in the line memory 811 at a timing corresponding to a correction data loading control signal input from the control device 803 is stored in the correction data storage device 813 via the correction memory 812. As in the first embodiment described above, correction data is stored by sampling beat noise superposed on a reference black level while the light source (not shown) is kept OFF. Hence, the video signal stored in the correction data storage device is data corresponding to beat data.

After the correction data is stored in the correction data storage device 813, normal original image reading is done. Upon reading an original image, beat noise removal correction is executed in the correction memory 812 for each line data of the original image read by the CCD line sensor 807. The video signal that has been subjected to beat noise removal correction is sent to an image processor 814. In synchronism with a frequency diffusion zero reset signal, i.e., a sync signal HSYNC, the image processor 814 executes image formation including an image decoration process.

As described above, when the arrangement described in this embodiment is adopted, beat noise arising from the frequency dispersion period can be removed by fixed noise pattern processing while fixing beat noise at a given position, as in the first embodiment described above. For this reason, high-quality image formation that maintains given quality of the read image data while maintaining a reduction effect of radiation noise can be realized.

The third embodiment of the present invention will be described below.

Figure 13:
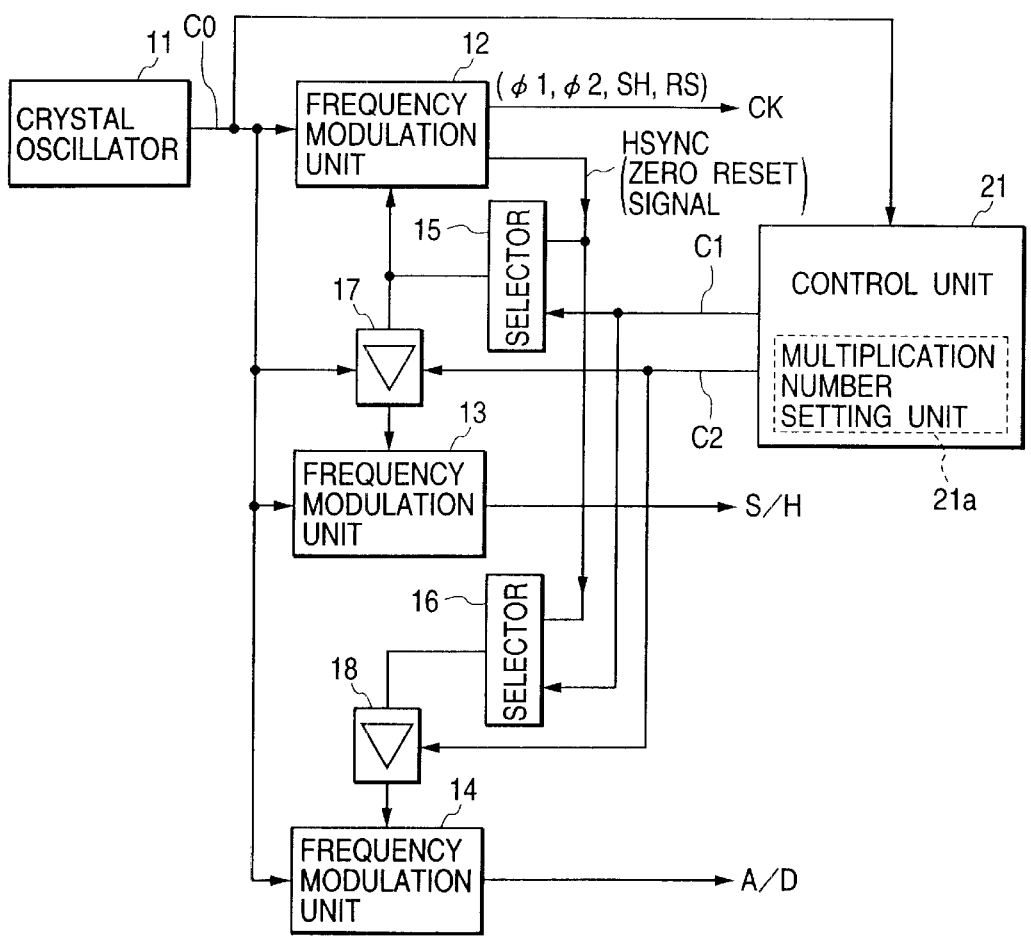
FIG. 13 is a block diagram showing the arrangement of a clock generation device in the third embodiment.
Figure 14:
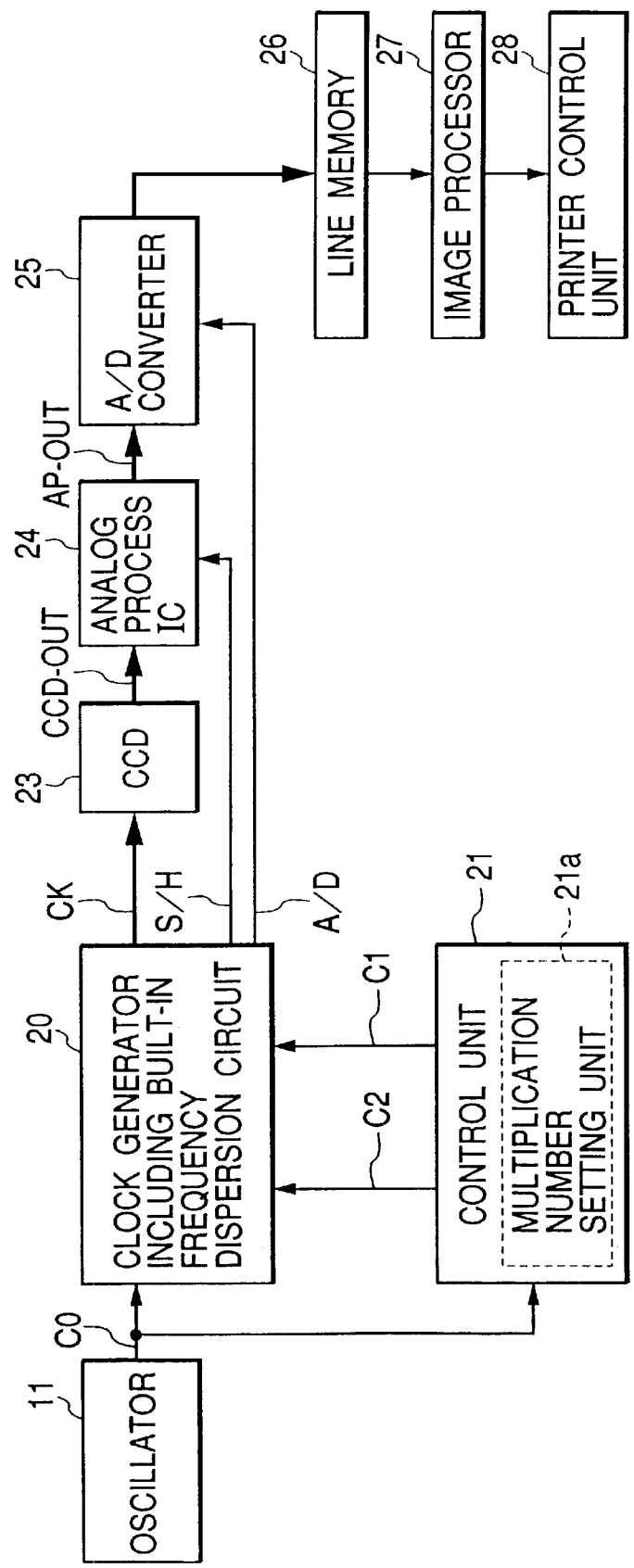
FIG. 14 is a block diagram showing the arrangement of principal part of an image forming apparatus which comprises the clock generation device shown in FIG. 13.

FIG. 13 is a block diagram showing the arrangement of a clock generating device according to this embodiment of the present invention. FIG. 14 is a block diagram showing the arrangement of a principle part of an image forming apparatus that includes the clock generating device as shown in FIG. 13, which figure is discussed below.

Referring to FIG. 14, a quartz oscillator 11 has high oscillation accuracy, and generates reference clocks CK0 by repeating oscillation at predetermined periods. A clock generator 20 including a built-in frequency dispersion circuit comprises a frequency dispersion unit, clock generation unit, and zero reset unit (to be described later) of the present invention. The clock generation unit of this clock generator is constructed by a multiplication wave generation circuit using a PLL (Phase Locked Loop) circuit for generating clocks having frequency higher than the reference clocks CK0, and a pulse generation circuit using a plurality of counters.

A control unit 21 controls the operation of the clock generator 20 including the built-in frequency dispersion circuit, and performs ON/OFF control of the zero reset unit, phase control, and multiplication control of the multiplication wave generation circuit, and the like.

In addition to a clock generation device constructed by the quartz oscillator 11, the clock generator 20 including a built-in frequency dispersion circuit, and the control unit 21, the image forming apparatus of this embodiment comprises a CCD 23, analog process IC 24, A/D converter 25, line memory 26, image processor 27, and printer control unit 28.

The clock generation device shown in FIG. 13 has first, second, and third frequency modulation units 12, 13, and 14, and also selectors 15 and 16, and programmable delay buffers 17 and 18 in correspondence with these frequency modulation units. The first, second, and third frequency modulation units 12, 13, and 14, selectors 15 and 16, and delay buffers 17 and 18 construct the clock generator 20 including a built-in frequency dispersion circuit shown in FIG. 14.

The first frequency modulation unit 12 frequency-disperses the reference clocks CK0 having a predetermined frequency output from the quartz oscillator 11, and generates and outputs the aforementioned transfer clocks $\phi 1$ and $\phi 2$, SH signal, RS signal, and the like as CCD drive clocks CK for driving the CCD 23. Furthermore, the first frequency modulation unit 12 outputs the aforementioned HSYNC signal as a zero reset signal to the inputs of the selectors 15 and 16 so as to zero reset frequency dispersion of the second and third frequency modulation units 13 and 14. More specifically, in this embodiment, the HSYNC signal represents the control interval of an image reading unit in the main scanning direction, and also serves as a zero reset signal for zero resetting frequency dispersion of the frequency modulation units 13 and 14.

The control unit 21 outputs an ON/OFF control signal C1 for turning on/off frequency dispersion to the selectors 15 and 16, and also a delay control signal C2 to the delay buffers 17 and 18.

The selector 15 selects based on "H"/"L" level of the ON/OFF control signal C1 from the control unit 21 whether or not it passes the HSYNC signal (zero reset signal) periodically output from the first frequency modulation unit 12 to the delay buffer 17, and returns it to the first frequency modulation unit 12 at the same time. Furthermore, the selector 16 selects based on "H"/"L " level of the ON/OFF control signal C1 from the control unit 21 whether or not it passes the HSYNC signal to the delay buffer 18. These selectors 15 and 16 can be constructed by, e.g., a logic IC (LCX244 or the like) with an enable input.

On the other hand, the delay buffers 17 and 18 are programmable delay buffers, which can delay their output signals by a predetermined period of time in accordance with setups (delay control signal C2) from the control unit 21.

In such arrangement of the clock generator 20, when the ON/OFF control signal C1 output from the control unit 21 is active (e.g., at "H" level), the HSYNC signal (zero reset signal) output from the first frequency modulation unit 12 is supplied to the frequency modulation units 13 and 14 via the selectors 15 and 16 and delay buffers 17 and 18. At this time, the phase of the HSYNC signal (zero reset signal) is delayed by clocks set in advance on the basis of the delay control signal C2 and reference clocks CK0 so as to reset modulation of the frequency modulation units 13 and 14, thus executing phase control for predetermined clocks.

Figure 15:
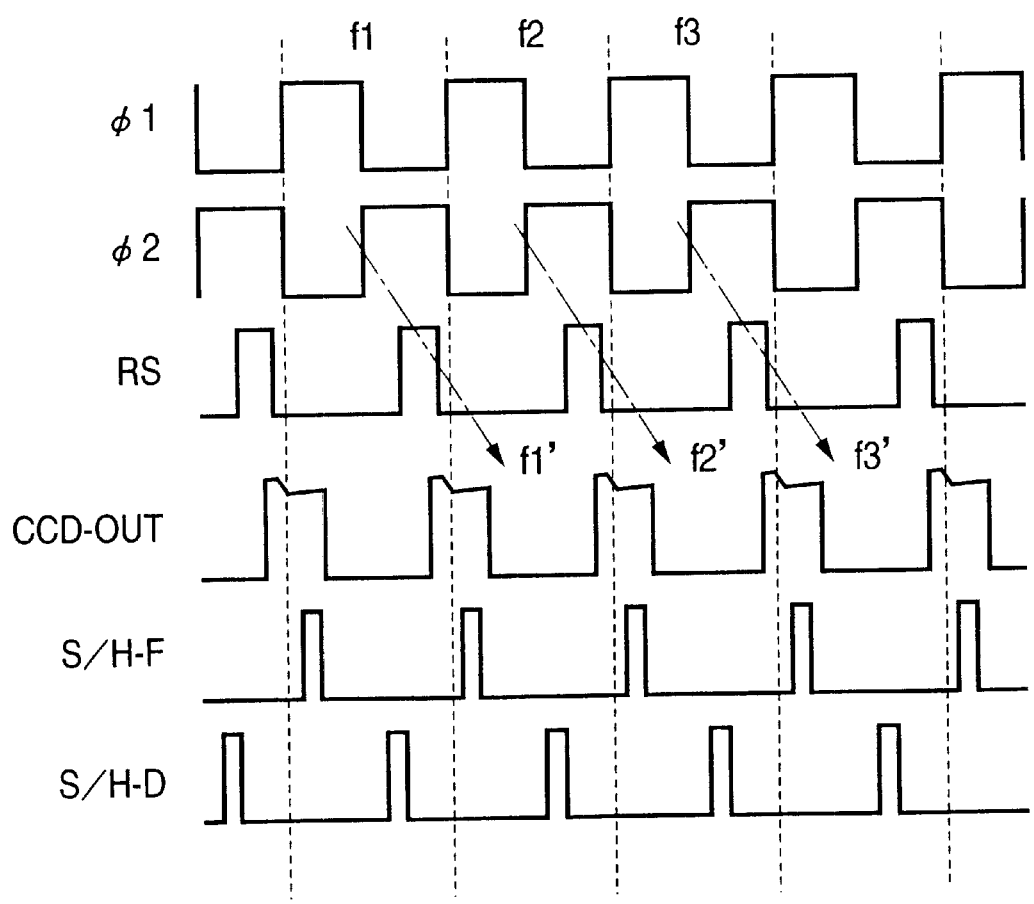
FIG. 15 is a waveform chart showing driving upon image reading.

With this control, as shown in the waveform chart in FIG. 15, the phase relationship between the drive clocks CK such as the transfer clocks $\phi 1$ and $\phi 2$, RS signal, and the like, and the aforementioned sample/hold pulses S/H-F, S/H-D, and CCD output CCD-OUT is delayed by one clock, and frequency dispersion zero reset control is also controlled while being delayed by one clock. More specifically, intervals f1 and f1' are controlled to have equal modulation periods.

In A/D clocks, the modulation periods in units of pixels of a drive control system of the image reading unit are controlled to be constant by generating clocks further delayed by one clock so as to sample the sample/hold level determined by the sample/hold pulse S/H-D.

Driving of the CCD 23 is started upon receiving the CCD drive clocks CK ($\phi 1$, $\phi 2$, SH signal, RS signal, and the like) generated by the first frequency modulation unit 12. An output signal CCD-OUT of the CCD 23 becomes an input signal to the analog process IC 24. Signal processing clocks S/H (S/H-F, S/H-D) generated by the second frequency modulation unit 13 are input to the analog process IC 24. The output from the analog process IC 24 is input to the A/D converter 25 as the sample/hold output of the signal processing clocks S/H. During this interval, since the level of the data portion is determined by the sampling pulse S/H-D, A/D clocks, whose phase is further delayed by one clock, are input to the A/D converter 25, as described above.

In the above description, a system in which one A/D converter is connected in series is used. Also, a system in which a plurality of A/D converters are connected in parallel with each other can be similarly controlled by inputting the A/D clocks.

In this manner, when the data level is sampled in a device using frequency dispersion, it is necessary to control the frequency modulation periods of a signal to be sampled and sampling signal to be equal to each other so as to attain more accurate data sampling. Hence, in this embodiment, a plurality of frequency dispersion control operations are made to attain phase control required in signal processes, and the signal period upon data sampling is controlled to be equal to that of the sampling clocks.

The operation upon image formation according to this embodiment will be described below with reference to the flowchart shown in FIG. 16.

After the power supply is turned on (step S11), it is checked if copy has been started upon depression of a copy button. Whether or not the copy button has been pressed is checked in step S12, and the control stands by in step S12 until the copy button is pressed.

If the copy button has been pressed, the flow advances to step S13. In step S13, the frequency modulation units 13 and 14 are zero reset at the predetermined timing upon starting the copy. As a result, the CCD drive clocks CK are generated and output, and at the same time, the signal processing clocks S/H and A/D clocks whose phase and modulation periods are controlled are generated and output, in step S14.

Subsequently, it is checked in step S15 if the next HSYNC signal (zero reset signal) is generated after the reset. If the next HSYNC signal is generated, the flow returns to step S13 to repeat the processes in steps S13 and S14. More specifically, an HSYNC signal (zero reset signal) is generated once per main scanning line, and the frequency modulation units 13 and 14 are zero reset every time an HSYNC signal is generated, i.e., at predetermined periods of main scans, thus adjusting the phase for every line.

Note that the effect of this embodiment can be obtained by generating the signal processing clocks S/H and A/D clocks to have a predetermined phase relationship after zero reset is done only once.

In step S16, the control waits until frequency modulation stabilizes, i.e., the controls waits for a predetermined period of time until the circuit operation becomes stable. Since black level is generally sampled during this interval, sampling is controlled to complete immediately before the lamp is turned on.

After an elapse of the wait time in step S16, the light source is turned on in step S17, original reading is started in step S18, and an image is formed in step S19.

As described above, according to this embodiment, since slight deviations of the modulation periods in the individual processing circuits units, which are produced when frequency dispersion is used, are corrected to bring the modulation state close to a state without frequency dispersion, the operation level stabilizes, and any deterioration of image quality resulting from frequency dispersion can be avoided while assuring high reduction effect of radiation noise level.

Figure 16:
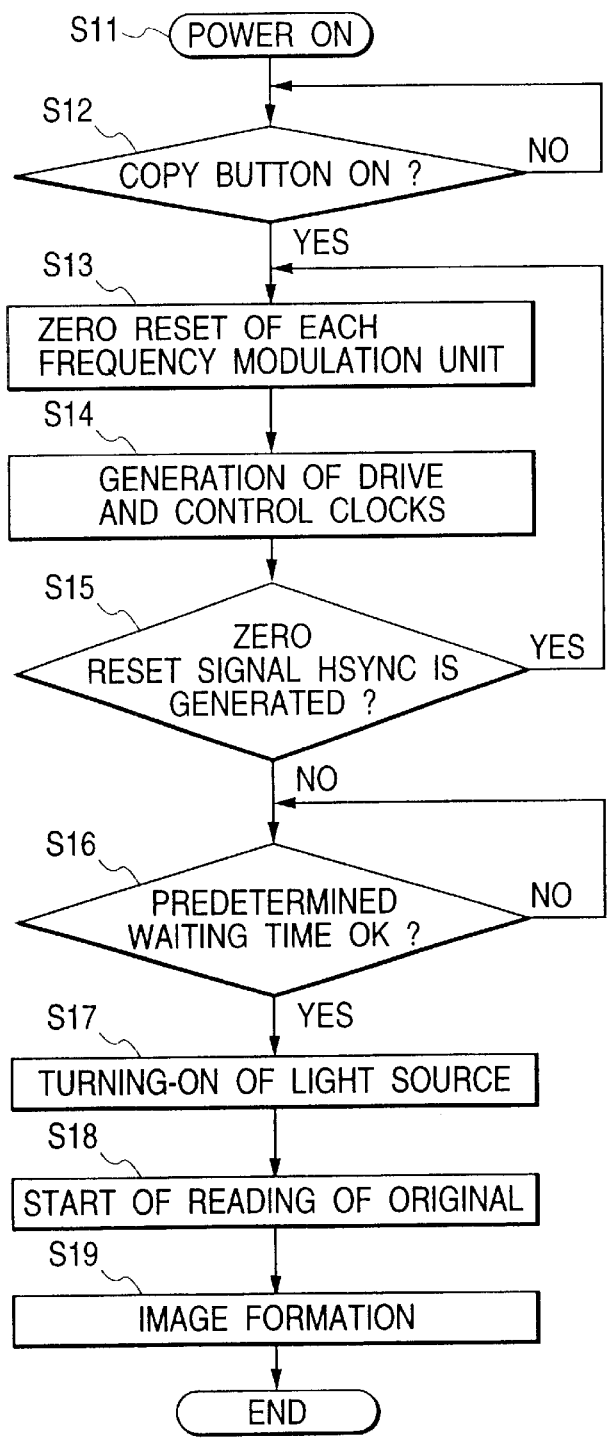
FIG. 16 is a flow chart showing the operation sequence upon image formation.

When a program according to the flowchart shown in FIG. 16 is stored in a storage device of the image forming apparatus and is executed, the aforementioned control method can be implemented.

The present invention is not limited to the apparatus of the above embodiment, and may be applied to either a system constituted by a plurality of equipments, or an apparatus consisting of a single equipment. The objects of the present invention are also achieved by supplying a storage medium, which records a program code of software that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. As the storage medium for supplying the program code, for example, a floppy disk, hard disk, optical disk, magnetooptical disk, CD-ROM, CD-R, magnetic tape, nonvolatile memory card, ROM, and the like may be used. The functions of the above-mentioned embodiments may be implemented not only by executing the readout program code by the computer but also by some or all of actual processing operations executed by an OS or the like running on the computer on the basis of an instruction of the program code.

Furthermore, after the program code read out from the storage medium is written in a memory of the extension board or unit which is inserted in or connected to the computer, the functions of the above-mentioned embodiments may be implemented by some or all of actual processing operations executed according to instructions of the next program codes, by a CPU or the like arranged in a function extension board or a function extension unit.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:
   an image reading unit that reads image data;
   an oscillation unit that oscillates a reference clock at predetermined periods;
   a frequency dispersion unit that (i) generates, using the reference clock, a clock signal having a frequency higher than a frequency of the reference clock and (ii) changes the frequency of the generated clock signal at the predetermined periods with respect to the frequency of the reference clock;
   a control clock generation unit that generates a control clock using the clock signal, the frequency of the control clock being changed by said frequency dispersion unit; and
   a reset unit that resets the change in frequency of the clock signal by said frequency dispersion unit in synchronism with said image reading unit.

2. An apparatus according to claim 1, further comprising a reference signal generation unit that generates, using the reference clock, a reference signal, wherein said reset unit resets the change in frequency of the clock signal based on the reference signal.

3. An apparatus according to claim 1, further comprising:
   a storage unit that stores, as correction reference data, image data read by said image reading unit in synchronism with the reference signal; and a correction unit that stores image data read by said image reading unit using the correction reference data.

4. A clock generation device comprising:
   a plurality of oscillation output units that perform frequency dispersion that changes an oscillation frequency at predetermined periods with respect to a reference clock; and
   a plurality of reset units that reset the frequency dispersion of said plurality of oscillation output units in accordance with a reference signal generated based on the reference clock.

5. An analog signal processing device comprising:
   a clock generator that generates a control clock by performing frequency dispersion that changes an oscillation frequency at predetermined periods with respect to a reference clock;
   an analog signal processing unit that processes a predetermined analog signal in accordance with the control clock; and
   a correction unit that corrects an error, which is produced by frequency dispersion of said clock generator, between the control clock and the analog signal.

6. A device according to claim 5, wherein said correction unit comprises a reset unit that resets frequency dispersion of said clock generator in accordance with a reference signal generated based on the reference clock.

7. An image forming apparatus comprising:
   a plurality of oscillation output units that generate a drive clock and a control clock by performing frequency dispersion that changes an oscillation frequency at predetermined periods with respect to a reference clock;

an image reading unit that reads an image in accordance with the drive clock;

a signal processing unit that performs a process that pertains to image formation with respect to an output signal from said image reading unit in accordance with the control clock; and a correction unit that corrects an error, which is produced by frequency dispersion of said plurality of oscillation output units, between the control clock and the output signal from said image reading unit.

8. An apparatus according to claim 7, wherein said correction unit comprises a reset unit that resets frequency dispersion of the respective oscillation output units in accordance with a reference signal generated based on the reference clock.

9. A clock control method comprising the steps of:

oscillating a reference clock at predetermined periods;

generating a clock signal having a frequency higher than a frequency of the reference clock using the reference clock;

changing the frequency of the clock signal at the predetermined periods with respect to the frequency of the reference clock;

generating a control clock using the clock signal, the frequency of which is changed; and resetting the continuous change in frequency of the clock signal in synchronism with image data.

10. A method according to claim 9, further comprising generating a reference signal using the reference clock, wherein the continuous change in frequency of the clock signal is reset using the reference signal.

11. A method according to claim 9, further comprising:

storing image data read in synchronism with the reference signal as correction reference data; correcting read image data using the correction reference data.

12. An analog signal processing method comprising the steps of:

generating a control clock by performing frequency dispersion that changes an oscillation frequency at predetermined periods with respect to a reference clock;

processing a predetermined analog signal in accordance with the control clock; and correcting an error, which is produced by frequency dispersion, between the control clock and the analog signal.

13. A method according to claim 12, wherein said correction step includes resetting frequency dispersion in accordance with a reference signal generated based on the reference clock.

14. An image forming method comprising the steps of:

generating drive and control clocks by performing frequency dispersion that changes an oscillation frequency at predetermined periods with respect to a reference clock;

reading an image via an image reading unit in accordance with the drive clock;

performing a predetermined process that pertains to image formation with respect to an output signal from said image reading unit in accordance with the control clock; and correcting an error, which is produced by frequency dispersion, between the control clock and the output signal from said image reading unit.

15. A method according to claim 14, wherein said correction step comprises resetting frequency dispersion in accordance with a reference signal generated based on the reference clock.

16. A storage medium storing a computer-readable program having code for performing a clock control method, the method comprising the steps of:

oscillating a reference clock at predetermined periods;

generating a clock signal having a frequency higher than a frequency of the reference clock using the reference clock;

changing the frequency of the clock signal at the predetermined periods with respect to the frequency of the reference clock;

generating a control clock using the clock signal, the frequency of which is changed; and resetting the continuous change in frequency of the clock signal in synchronism with image data.

17. A medium according to claim 16, wherein the method further comprises generating a reference signal using the reference clock, wherein the change in frequency of the clock signal is reset using the reference signal.

18. A medium according to claim 16, wherein the method further comprises:

storing image data read in synchronism with the reference signal as correction reference data; and a step of correcting read image data using the correction reference data.

19. A storage medium storing a computer-readable program having code for performing a clock control method, the method comprising the steps of:

generating a control clock by performing frequency dispersion that changes an oscillation frequency at predetermined periods with respect to a reference clock;

processing a predetermined analog signal in accordance with the control clock; and correcting an error, which is produced by frequency dispersion, between the control clock and the analog signal.

20. A medium according to claim 19, wherein said correction step comprises a step of resetting frequency dispersion in accordance with a reference signal generated based on the reference clock.

21. A storage medium storing a computer-readable program having code for performing a clock control method, the method comprising the steps of:

generating a drive clock and a control clock by performing frequency dispersion that changes an oscillation frequency at predetermined periods with respect to a reference clock;

reading an image via an image reading unit in accordance with the drive clock;

performing a predetermined process that pertains to image formation with respect to an output signal from said image reading step in accordance with the control clock; and correcting an error, which is produced by frequency dispersion, between the control clock and the output signal from said image reading step.

22. A medium according to claim 21, wherein said correction step comprises resetting frequency dispersion in accordances with a reference signal generated based on the reference clock.

* * * * *